United States Patent
Genevski et al.

(10) Patent No.: US 9,826,035 B2
(45) Date of Patent: Nov. 21, 2017

(54) PIECEWISE LINEAR, PROBABILISTIC, BACKOFF METHOD FOR RETRYING MESSAGE DELIVERY IN A CLOUD-BASED COMPUTING ENVIRONMENT

(71) Applicants: Pavel Genevski, Sofia (BG); Stoyan Boshev, Sofia (BG)

(72) Inventors: Pavel Genevski, Sofia (BG); Stoyan Boshev, Sofia (BG)

(73) Assignee: SAP SE, Walldorf (DE)

(*) Notice: Subject to any disclaimer, the term of this patent is extended or adjusted under 35 U.S.C. 154(b) by 715 days.

(21) Appl. No.: 14/302,041

(22) Filed: Jun. 11, 2014

(65) Prior Publication Data

US 2015/0365476 A1    Dec. 17, 2015

(51) Int. Cl.
*G06F 15/16* (2006.01)
*H04L 29/08* (2006.01)

(52) U.S. Cl.
CPC ........ *H04L 67/1095* (2013.01); *H04L 67/325* (2013.01)

(58) Field of Classification Search
CPC ..................... H04L 67/1095; H04L 67/325
See application file for complete search history.

(56) References Cited

U.S. PATENT DOCUMENTS

| | | | | |
|---|---|---|---|---|
| 5,502,724 A | * | 3/1996 | Chen ............... | H04L 12/413 370/445 |
| 6,016,527 A | * | 1/2000 | DeMoss ........... | G06F 13/372 710/107 |
| 2004/0023651 A1 | * | 2/2004 | Gollnick ........... | G08C 17/02 455/423 |
| 2006/0050728 A1 | * | 3/2006 | Sung ................ | H04L 12/413 370/448 |

OTHER PUBLICATIONS

What is Backoff Algorithm? Wiki Answers; 4 pages; http://wiki.answers.com/Q/What_is_backoff_algorith; [Retrieved Jun. 9, 2014].
Yassein, M. Bani, et al. "A Performance Comparison of Different Backoff Algorigthms under Fifferent rebroadcast Probabilities for MANET's", 7 pages, Dept. of Computer Science, Jordan University of Science and Technology, http://www.comp.leeds.ac.uk/ukpew09/papers/12.pdf; [Retrieved Jun. 9, 2014].

(Continued)

Primary Examiner — Viet Vu
(74) Attorney, Agent, or Firm — Fish & Richardson P.C.

(57) ABSTRACT

The present disclosure describes methods, systems, and computer program products for retrying message delivery in a network. One computer-implemented method includes determining a retry window (RW) for one or more retry attempts to send a message to a target system, determining a minimum silent interval (MSI) representing the minimum permitted time interval between two successive retry attempts, dividing the RW into one or more time slots of N duration, randomly determining, by a hardware processor, a point-in-time within a time slot starting from the beginning time of the time slot, and sending a message as a retry attempt to the target system at the point-in-time.

20 Claims, 3 Drawing Sheets

(56) References Cited

OTHER PUBLICATIONS

Manaseer, Saher S. et al. "Logarithmic Based Backoff Algorithm for MAC Protocol in MANET's", Dept. of Computing Science, University of Glasgow, 6 pages http://www.dcs.gla.ac.uk/publications/PAPERS/8193/TR-2006-213.pdf; [Retrieved Jun. 9, 2014].
Exponential backoff, http://en.wikipedia.org/w/index.php?title=Exponential_backoff&oldid=611307121; 4 pages [Retrieved Jun. 9, 2014].

* cited by examiner

PIECEWISE LINEAR, PROBABILISTIC, BACKOFF METHOD FOR RETRYING MESSAGE DELIVERY IN A CLOUD-BASED COMPUTING ENVIRONMENT

BACKGROUND

Given a problem with a connection between a sender and receiver in a communication network (such as a cloud-based computing environment network) with multiple sender systems and a receiver system, the usual technique is to implement retries in the sender systems. However, if multiple sender systems retry the connection at the same time, network congestion can result. Backoff algorithms are normally used to optimize the process of retrying the sending of a message and are designed to space out repeated retransmissions of the same message in order to balance two contradictory requirements: 1) a sender system message shall be delivered to the receiver system as soon as possible in order to minimize latency and 2) the sender system shall not retry too many times, because each retry attempt leads to additional load on the sender/receiver systems involved. A non-optimized backoff algorithm can lead to network congestion, data loss/failure, monetary loss, rework, customer confusion and dissatisfaction, a poor user experience, and/or rejection of systems/applications/data in favor of competing products.

SUMMARY

The present disclosure relates to computer-implemented methods, computer-readable media, and computer systems for retrying message delivery in a network. One computer-implemented method includes determining a retry window (RW) for one or more retry attempts to send a message to a target system, determining a minimum silent interval (MSI) representing the minimum permitted time interval between two successive retry attempts, dividing the RW into one or more time slots of N duration, randomly determining, by a hardware processor, a point-in-time within a time slot starting from the beginning time of the time slot, and sending a message as a retry attempt to the target system at the point-in-time.

Other implementations of this aspect include corresponding computer systems, apparatuses, and computer programs recorded on one or more computer storage devices, each configured to perform the actions of the methods. A system of one or more computers can be configured to perform particular operations or actions by virtue of having software, firmware, hardware, or a combination of software, firmware, or hardware installed on the system that in operation causes or causes the system to perform the actions. One or more computer programs can be configured to perform particular operations or actions by virtue of including instructions that, when executed by data processing apparatus, cause the apparatus to perform the actions.

The foregoing and other implementations can each optionally include one or more of the following features, alone or in combination:

A first aspect, combinable with the general implementation, wherein the RW can be of a fixed duration or dynamically determined.

A second aspect, combinable with any of the previous aspects, wherein the MSI can be of a fixed duration or dynamically determined.

A third aspect, combinable with any of the previous aspects, where the random determination is performed using a uniform probability distribution.

A fourth aspect, combinable with any of the previous aspects, comprising determining that the determined point in time within the time slot is less than the determined MSI and moving the point-in-time within the time slot to satisfy the MSI.

A fifth aspect, combinable with any of the previous aspects, comprising determining whether the sending of the message as a retry attempt was successful.

A sixth aspect, combinable with any of the previous aspects, comprising progressing to the point-in-time in the next applicable time slot once if it is determined that the sending of the message as a retry attempt was not successful.

The subject matter described in this specification can be implemented in particular implementations so as to realize one or more of the following advantages. First, network congestion is reduced or eliminated resulting in higher network performance between sender systems and a target system (receiver) as well as overall network performance. Second, the reduction in network congestion can reduce or eliminate other types of network failures related to network congestion. Third, load on each sender system is reduced as the sender system is not continuously retrying the sending of messages. Fourth, the load on the receiver system is reduced as each sender system is not attempting to send a message at a similar point-in-time to the receiver system. Fifth, network throughput is increased. Latency and throughput are orthogonal to each other apart from the addition of a communications protocol (e.g., transmission control protocol (TCP) and other communications protocols). Accordingly, increases in latency have a severe impact on throughput in case of transmission errors or interferences. Any reduction of latency helps preserve network throughput. Other advantages will be apparent to those skilled in the art.

The details of one or more implementations of the subject matter of this specification are set forth in the accompanying drawings and the description below. Other features, aspects, and advantages of the subject matter will become apparent from the description, the drawings, and the claims.

DESCRIPTION OF DRAWINGS

Like reference numbers and designations in the various drawings indicate like elements.

DETAILED DESCRIPTION

The following detailed description is presented to enable any person skilled in the art to make, use, and/or practice the disclosed subject matter, and is provided in the context of one or more particular implementations. Various modifications to the disclosed implementations will be readily apparent to those skilled in the art, and the general principles defined herein may be applied to other implementations and applications without departing from scope of the disclosure. Thus, the present disclosure is not intended to be limited to the described and/or illustrated implementations, but is to be accorded the widest scope consistent with the principles and features disclosed herein.

This disclosure generally describes computer-implemented methods, computer-program products, and systems for retrying message delivery in a network, and particularly a cloud-based computing environment. An algorithmic retry manager (on a sender system) issues retry attempts with a uniform probability distribution in order to avoid excessive load being applied to a target (receiver) system. The simplified example cloud-based computing environment client/server architecture (e.g., multiple sender systems (clients) and a single receiver system (server) of FIG. 1) is provided for reasons of explanation and understanding and is not meant to limit the concepts to the provided example(s). In other implementations, sender systems and receiver systems can be of identical types and/or there can be more or less of the sender systems and/or receiver system.

In complex information technology (IT) landscapes (e.g., a cloud-based computing environment network), computer systems communicate with each other using various protocols. While some of these protocols, such as transmission control protocol (TCP), have some basic, built in mechanisms for recovery upon a communications failure, at the application-level things are usually more complex. Messages from one system to another might not be delivered due to a variety of reasons, coming not only from the communications stack, but also from the application stack. For example, a system may not be able to respond immediately, because it is being restarted at the moment or it is under an excessive load. One possible method for recovery in such situations is to retry one or more times. Backoff algorithms are normally used to optimize the process of retrying the sending of a message. The time interval between the retries could be fixed (linear backoff) or could depend on the number of attempts and the sequential number of the attempt (e.g., using an exponential backoff algorithm).

Given a problem with a connection between a sender and receiver in a communication network with multiple sender systems and a receiver system, the usual technique is to implement retries in the sender systems. However, if multiple sender systems retry the connection at the same time, network congestion can result. Backoff algorithms must balance two contradictory requirements: 1) a sender system message shall be delivered to the receiver system as soon as possible in order to minimize latency and 2) the sender system shall not retry too many times, because each retry attempt leads to additional load on the sender/receiver systems involved. A non-optimized backoff algorithm can lead to network congestion, data loss/failure, monetary loss, rework, customer confusion and dissatisfaction, a poor user experience, and/or rejection of systems/applications/data in favor of competing products.

Given the contradictory requirements to be balanced, a perfect backoff algorithm would resemble the following: After an initial message send failure from a sender system, there would be only one retry attempt by the sender system. The retry attempt would succeed and take place exactly at the time when the receiver system becomes available. It should be noted that while a single retry is certainly possible to achieve, immediate delivery is often impossible in practice for a couple of reasons. First, it is often the case that a prediction of exactly when the receiver system will become available cannot be made. Second, the receiver system and the network infrastructure between the sender system and the receiver system have some finite processing throughput limitations and that might be saturated if all sender systems retry message sending at exactly the same point-in-time. The latter leads to delays in message processing and voids the assumption for immediate delivery. If the number of the sender systems is above a certain threshold, subsequent failures associated with the number of sender systems might occur as well, which would also void the assumption for a single retry. From this, it becomes clear that a universal backoff algorithm that is optimal under all circumstances cannot exist, due to uncertainties involved.

In an implementation, at a high level, an improved piecewise, linear, probabilistic, backoff algorithm can resemble:
1. Once a failure occurs in a message communication between a sender system and a receiver system, intervals of time—a retry window (RW) and a minimum silent interval (MSI)—are determined. The MSI represents the minimum permitted time interval between two retry attempts.
2. The determined RW is divided into N time slots with equal duration inside in which retry attempts will take place.
3. The sender system randomly determines a point-in-time inside a time slot (starting from time (t)=0) using a probability distribution (e.g., a uniform probability distribution). If the determined point-in-time leads to a time interval between the previous and the current retry attempt that is less than the MSI, the point-in-time is moved forward in time, so that the MSI is satisfied.
4. The sender system sends the message at the point-in-time.
5. In a case where the message delivery is successful, the algorithm terminates successfully.
6. In case of a failure in message delivery, the algorithm progresses to the next applicable time slot. This could be the next slot in the sequence or some slots could be skipped in case they have already elapsed while the last retry was executed. The algorithm then either goes back to 3 or, in a case where no more time slots exist for a retry attempt (e.g., RW is finished), terminates with a failure.

In an implementation, at a low level, a software code example of the improved piecewise, linear, probabilistic, backoff algorithm algorithmic can resemble:

```
long startTime = System.currentTimeMillis( );
long currentTime = startTime;
// X - defines the retry window in ms(e.g., 10000)
long retryWindow = X + currentTime;
// N - defines the retry slot time in ms(e.g., 2000)
int slotSize = N;
// M - defines the minimum wait time in ms between subsequent
retries (e.g., 200)
int minWaitTime = M;
int currentSlot = 0;
do {
    long sleepTime = ((startTime + currentSlot * slotSize) -
currentTime) + Math.random(slotSize);
    if (sleepTime < minWaitTime) {
        sleepTime = minWaitTime;
    }
    Thread.sleep(sleepTime);
    boolean success = <execute retry>;
    currentTime = System.currentTimeMillis( );
    currentSlot++;
    if (currentSlot < (currentTime - startTime) / slotSize) {
        // align current slot according to the current time
        currentSlot = (currentTime - startTime) / slotSize;
    }
} while (!success || (currentTime + slotSize) <= retryWindow).
```

Figure 1:
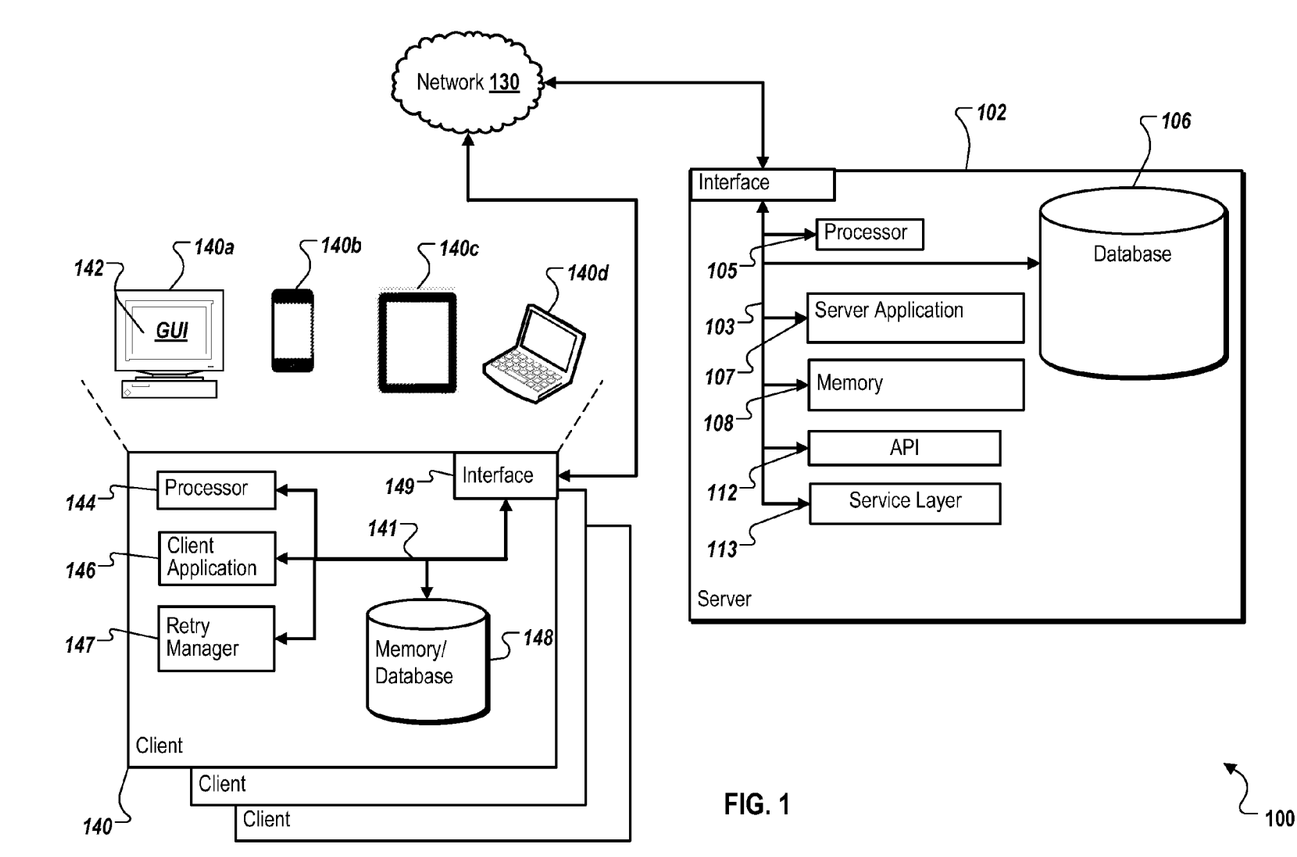
FIG. 1 is a block diagram illustrating an example distributed computing system (EDCS) for retrying message delivery in a network according to an implementation.

FIG. 1 is a block diagram illustrating an example distributed computing system (EDCS) 100 for retrying message delivery in a network according to an implementation. The illustrated EDCS 100 includes or is communicably coupled with a server 102 and multiple clients 140 that communicate across a cloud-based computing network 130. In some implementations, one or more components of the EDCS 100 may be configured to operate inside and/or outside of a cloud-based computing environment.

At a high level, the server 102 is an electronic computing device operable to receive, transmit, process, store, or manage data and information associated with the EDCS 100. In general, the server 102 provides functionality appropriate to a server, including database functionality and receiving/serving content and/or functionality from/to a client 140. According to some implementations, the server 102 may also include or be communicably coupled with an e-mail server, a web server, a caching server, a streaming data server, a business intelligence (BI) server, and/or other server.

The server 102 is responsible for receiving, among other things, requests and/or content from one or more client applications 146 and/or retry managers 147 associated with the client 140 of the EDCS 100. The server 102 can also respond to received requests, for example requests processed by a server application 107 and/or database 106.

In addition to requests received from the client 140, requests may also be sent to the server 102 from internal users, external or third-parties, other automated applications, as well as any other appropriate entities, individuals, systems, or computers. In some implementations, various requests can be sent directly to server 102 from a user accessing server 102 directly (e.g., from a server command console or by other appropriate access method).

Each of the components of the server 102 can communicate using a system bus 103. In some implementations, any and/or all the components of the server 102, both hardware and/or software, may interface with each other and/or the interface 104 over the system bus 103 using an application programming interface (API) 112 and/or a service layer 113. The API 112 may include specifications for routines, data structures, and object classes. The API 112 may be either computer-language independent or dependent and refer to a complete interface, a single function, or even a set of APIs. The service layer 113 provides software services to the EDCS 100. The functionality of the server 102 may be accessible for all service consumers using this service layer. Software services, such as those provided by the service layer 113, provide reusable, defined business functionalities through a defined interface. For example, the interface may be software written in JAVA, C++, or other suitable language providing data in extensible markup language (XML) format or other suitable format.

While illustrated as an integrated component of the server 102 in the EDCS 100, alternative implementations may illustrate the API 112 and/or the service layer 113 as stand-alone components in relation to other components of the EDCS 100. Moreover, any or all parts of the API 112 and/or the service layer 113 may be implemented as child or sub-modules of another software module, enterprise application, or hardware module without departing from the scope of this disclosure. For example, the API 112 could be integrated into the database 106, the server application 107, the server framework 109, and/or wholly or partially in other components of server 102 (whether or not illustrated).

The server 102 includes an interface 104. Although illustrated as a single interface 104 in FIG. 1, two or more interfaces 104 may be used according to particular needs, desires, or particular implementations of the EDCS 100. The interface 104 is used by the server 102 for communicating with other systems in a distributed environment—including within the EDCS 100—connected to the network 130; for example, the client 140 as well as other systems communicably coupled to the network 130 (whether illustrated or not). Generally, the interface 104 comprises logic encoded in software and/or hardware in a suitable combination and operable to communicate with the network 130. More specifically, the interface 104 may comprise software supporting one or more communication protocols associated with communications such that the network 130 or interface's hardware is operable to communicate physical signals within and outside of the illustrated EDCS 100.

The server 102 includes a processor 105. Although illustrated as a single processor 105 in FIG. 1, two or more processors may be used according to particular needs, desires, or particular implementations of the EDCS 100. Generally, the processor 105 executes instructions and manipulates data to perform the operations of the server 102. Specifically, the processor 105 executes the functionality required for receiving messages from one or more clients 140 retrying message delivery in a network.

The server 102 also includes a database 106 that holds data for the server 102, client 140, and/or other components of the EDCS 100. Although illustrated as a single database 106 in FIG. 1, two or more databases may be used according to particular needs, desires, or particular implementations of the EDCS 100. While database 106 is illustrated as an integral component of the server 102, in alternative implementations, database 106 can be external to the server 102 and/or the EDCS 100. Database 106 can be configured to store one or more instances of any appropriate data (e.g., user profiles, objects and content, client data, etc.—whether or not illustrated) consistent with this disclosure.

The server application 107 is an algorithmic software engine capable of providing, among other things, any appropriate function consistent with this disclosure for the server 102 (e.g., receiving, processing, transmitting, and/or other functionality with respect to a message sent by a client 140). In some implementations, the server application 107 can be used for functions particular to the server 102. In some implementations, the server application 107 can provide and/or modify content provided by and/or made available to other components of the EDCS 100. In other words, the server application 107 can act in conjunction with one or more other components of the server 102 and/or EDCS 100 in responding to a message (e.g., a request) for content received from the client 140.

Although illustrated as a single server application 107, the server application 107 may be implemented as multiple server applications 107. In addition, although illustrated as integral to the server 102, in alternative implementations, the server application 107 can be external to the server 102 and/or the EDCS 100 (e.g., wholly or partially executing on the client 140, other server 102 (not illustrated), etc.). Once a particular server application 107 is launched, the particular server application 107 can be used, for example by an application or other component of the EDCS 100 to interactively process received messages (e.g., from client 140). In some implementations, the server application 107 may be a network-based, web-based, and/or other suitable application consistent with this disclosure.

In some implementations, a particular server application 107 may operate in response to and in connection with at least one message received from other server applications

107, other components (e.g., software and/or hardware modules) associated with another server 102, and/or other components of the EDCS 100. In some implementations, the server application 107 can be accessed and executed in a cloud-based computing environment using the network 130. In some implementations, a portion of a particular server application 107 may be a web service associated with the server application 107 that is remotely called, while another portion of the server application 107 may be an interface object or agent bundled for processing by any suitable component of the EDCS 100. Moreover, any or all of a particular server application 107 may be a child or sub-module of another software module or application (not illustrated) without departing from the scope of this disclosure. Still further, portions of the particular server application 107 may be executed or accessed by a user working directly at the server 102, as well as remotely at a corresponding client 140. In some implementations, the server 102 or any suitable component of server 102 or the EDCS 100 can execute the server application 107.

The memory 108 typically stores objects and/or data associated with the purposes of the server 102 but may also be used in conjunction with the database 106 to store, transfer, manipulate, etc. objects and/or data. The memory 108 can also consistent with other memories within the EDCS 100 and be used to store data similar to that stored in the other memories of the EDCS 100 for purposes such as backup, caching, and/or other purposes.

The client 140 may be any computing device operable to connect to and/or communicate with at least the server 102. In general, the client 140 comprises an electronic computing device operable to receive, transmit, process, and store any appropriate data associated with the EDCS 100, for example, the server application 107. More particularly, among other things, the client 140 can collect content from the client 140 and upload the collected content to the server 102 for processing by the server application 107. The client typically includes a processor 144, a client application 146, retry manager 147, a memory/database 148, and/or an interface 149 interfacing over a system bus 141.

In some implementations, the client application 146 can use parameters, metadata, and other information received at launch to access a particular set of data from the server 102 and/or other components of the EDCS 100. Once a particular client application 146 is launched, a user may interactively process a task, event, or other information associated with the server 102 and/or other components of the EDCS 100. For example, the client application 146 can generate and transmit a particular message (e.g., a database request or a request for content) to the server 102.

The client application 146 is any type of application that allows the client 140 to navigate to/from, request, view, create, edit, delete, administer, and/or manipulate content associated with the server 102 and/or the client 140. For example, the client application 146 can present GUI displays and associated data to a user that is generated/transmitted by the server 102 (e.g., the server application 107 and/or database 106). In some implementations, the client application 146 can work in conjunction with the retry manager 147 to ensure that the server 102 has received a message transmitted by the client 140 to the server 102.

In some implementations, the client application 146 can be registered with the retry manager 147 to manage retrying transmission of a message to the server 102 in the event of a transmission or other failure (e.g., the server 102 response with a transfer control protocol (TCP) or hypertext transfer protocol (HTTP) failure code following an attempt to transmit a message to the server 102). In other implementations, the retry manager can provide an API (e.g., an open source-type, open-standard, and/or proprietary API), functions, etc. to allow client applications 146 to retry sending messages to the server 102.

In some implementations, the client application 146 can also be used to perform administrative functions related to the server application 107, database 106, and/or the server 102 in general. For example, the server application 107 can generate and/or transmit administrative pages to the client application 146 based on a particular user login, request, etc.

Further, although illustrated as a single client application 146, the client application 146 may be implemented as multiple client applications in the client 140. For example, there may be a native client application and a web-based (e.g., HTML) client application depending upon the particular needs of the client 140 and/or the EDCS 100.

Figure 3:
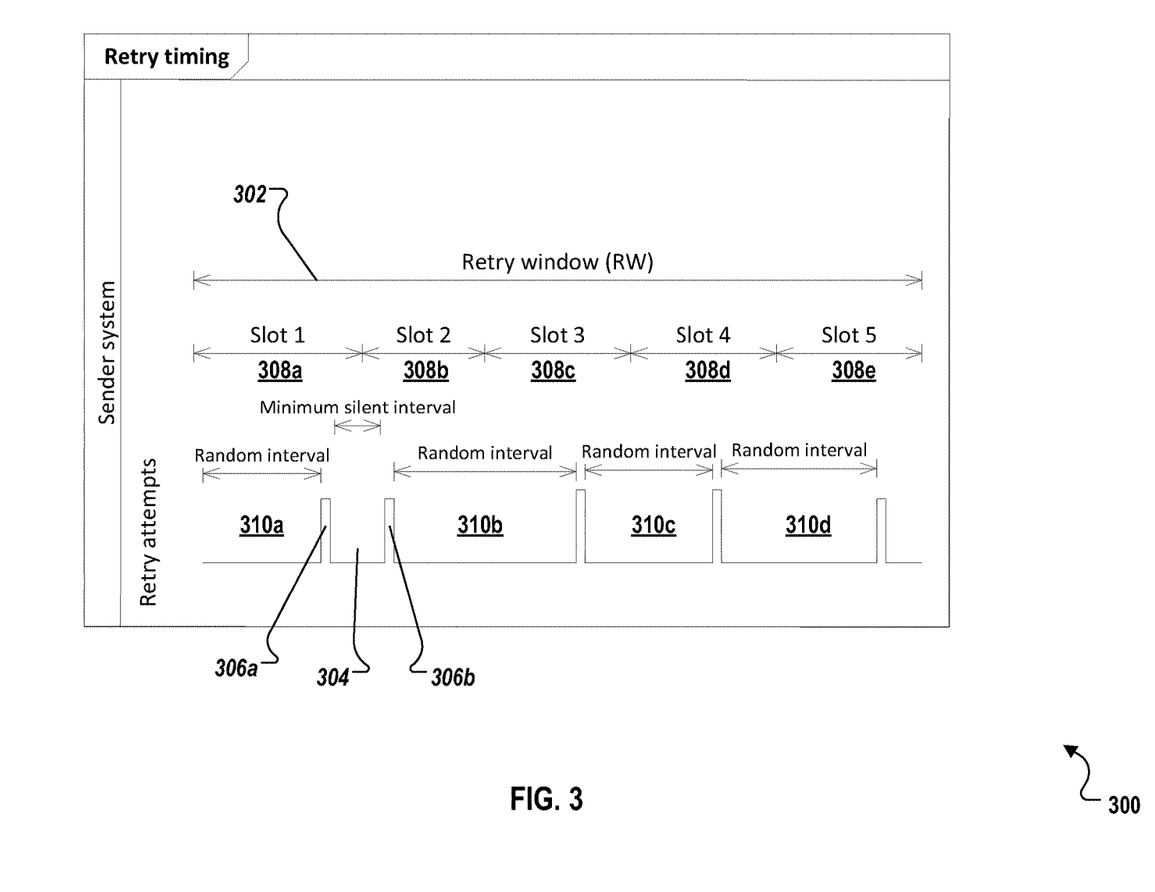
FIG. 3 illustrates a timing diagram associated with a sender system retrying message delivery in a network according to an implementation.

The retry manager 147 is an algorithmic software engine that can be used to manage, coordinate, and/or execute one or more of the various functions described particularly in FIG. 3 to retry transmission of a message to the server 102 in the event of a failure to transmit an initial one or more messages to the server 102. In some implementations, the retry manager 147 can be implemented in JAVASCRIPT or other scripting language and execute in the client application 146 (e.g., a browser). In some implementations, a separate retry manager 147 is associated with each client application 146 (e.g., 1:1 correspondence between a retry manager 147 and a browser—client application 146).

The retry manager 147 can be used by the client application 146 and/or other elements of the client 140 and/or server 102 (including other clients 140 and/or servers 102) to ensure receipt of messages transmitted by a client 140 to a server 102. For example, a retry manager 147 could be a plugin that runs with a client application 146 browser. Note that in some implementations, not all client applications 146 may be associated with the retry manager 147 and/or functionality to retry message delivery in a network and ensure receiving messages at the server 102 (e.g., by the server application 107 and/or the database 106) from one or more clients 140.

In some implementations, the retry manager 147 can act as an interface between the server 102 and the client application 146 for some or all data transmitted to and/or from the server 102. In some implementations, the client application 146 and/or retry manager 147 can perform some type of pre-processing before transmitting any data to the server (e.g., the server application 107, database 106, etc.).

The retry manager 147 generates and transmits notifications to clients associated with the client 140 once state data is received by the client 140. For example, the retry manager 147 is aware of client applications 146 executing on the client 140 and which client applications 146 the received state data 120 is applicable to. The retry manager 147 then transmits notifications to the appropriate clients with the appropriate state data so that the client applications 146 can update their state.

In some implementations, the retry manager 147 can initiate presentation of GUI displays and associated data to a user using the client application 146 and/or memory/database 148. The GUI displays can display data, accept user input, and initiate transmission (e.g., a sending retry) of messages to the server 102.

The interface 149 is used by the client 140 for communicating with other computing systems in a distributed computing system environment, including within the EDCS 100, using network 130. For example, the client 140 uses the interface to communicate with a server 102 as well as other systems (not illustrated) that can be communicably coupled to the network 130. The interface 149 may be consistent with the above-described interface 104 of the server 102. The processor 144 may be consistent with the above-described processor 105 of the server 102. Specifically, the processor 144 executes instructions and manipulates data to perform the operations of the client 140, including the functionality required to retry message delivery in a network to the server 102 and to receive and process responses from the server 102.

The memory/database 148 typically stores objects and/or data associated with the purposes of the client 140 but may also be consistent with the above-described database 106 and/or memory 108 of the server 102 or other memories within the EDCS 100 and be used to store data similar to that stored in the other memories of the EDCS 100 for purposes such as backup, caching, and the like. Although illustrated as a combined memory/database, in some implementations, the memory and database can be separated (e.g., as in the server 102).

Further, the illustrated client 140 includes a GUI 142 that interfaces with at least a portion of the EDCS 100 for any suitable purpose. For example, the GUI 142 (illustrated as associated with client 140a) may be used to view and/or transmit data associated with the client 140, the server 102, or any other component of the EDCS 100. In particular, in some implementations, the client application 146 may render GUI interfaces received from the server application 107, retry manager 147, and/or data retrieved from any element of the EDCS 100.

There may be any number of clients 140 associated with, or external to, the EDCS 100. For example, while the illustrated EDCS 100 includes three clients 140 communicably coupled to the server 102 using network 130, alternative implementations of the EDCS 100 may include any number of clients 140 suitable to the purposes of the EDCS 100. Additionally, there may also be one or more additional clients 140 external to the illustrated portion of the EDCS 100 that are capable of interacting with the EDCS 100 using the network 130. Further, the term "client" and "user" may be used interchangeably as appropriate without departing from the scope of this disclosure. Moreover, while the client 140 is described in terms of being used by a single user, this disclosure contemplates that many users may use one computer, or that one user may use multiple computers.

The illustrated client 140 (example implementations illustrated as 140a-140d) is intended to encompass any computing device such as a desktop computer/server, laptop/notebook computer, wireless data port, smart phone, personal data assistant (PDA), tablet computing device, one or more processors within these devices, or any other suitable processing device. For example, the client 140 may comprise a computer that includes an input device, such as a keypad, touch screen, or other device that can accept user information, and an output device that conveys information associated with the operation of the server 102 or the client 140 itself, including digital data, visual and/or audio information, or a GUI 142 (illustrated by way of example only with respect to the client 140a).

In some implementations, the retry manager 147 can generate log data (not illustrated) to persist on the memory/database 148. The log data can be used to determine failures to transmit messages to the server 102, other clients 140, etc. The log data can also be used (in conjunction with other described functionality) to re-schedule transmission of messages to the server 102, other clients 140, and/or any other functionality consistent with this disclosure.

Figure 2:
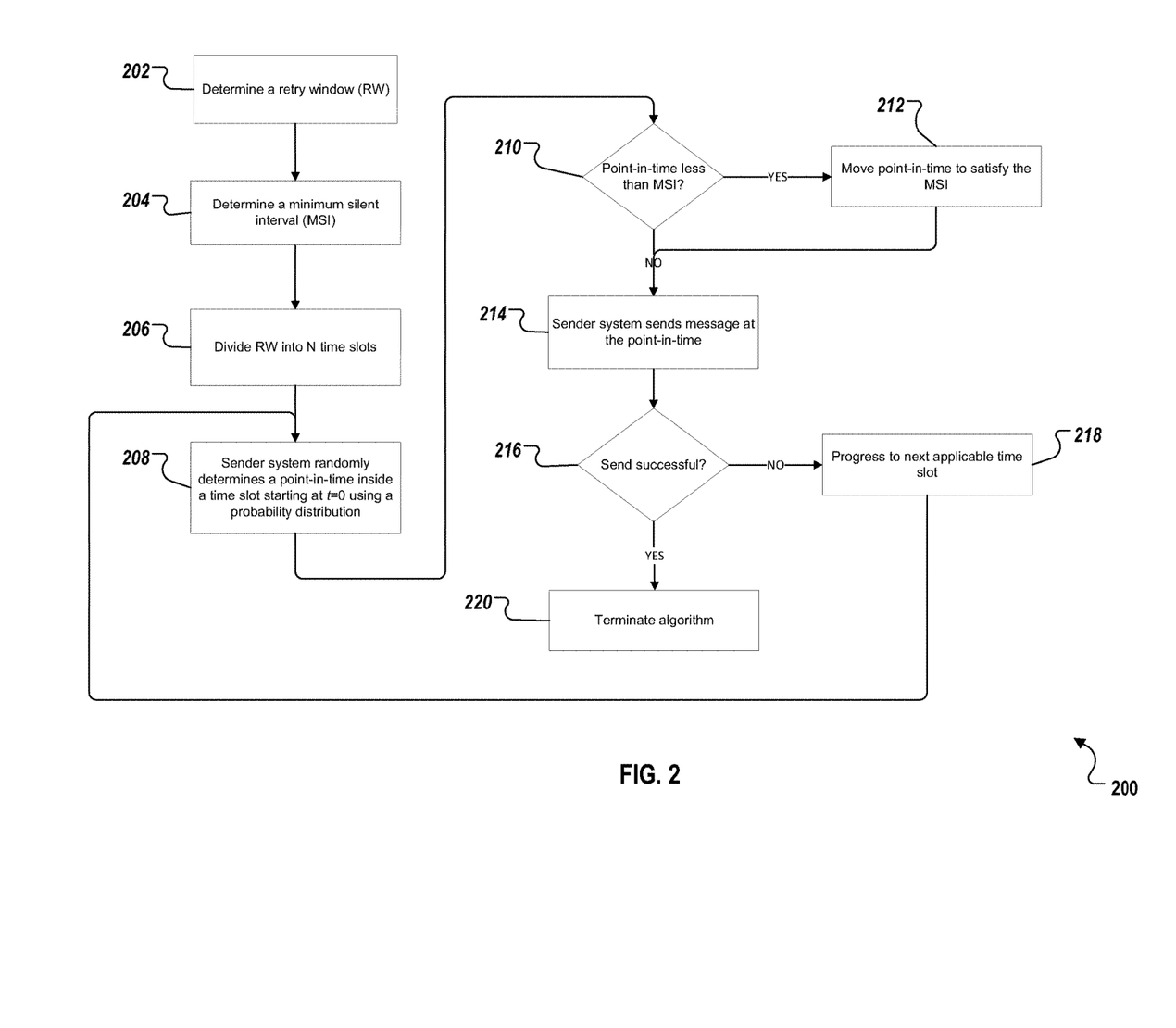
FIG. 2 is a flow chart illustrating a method for retrying message delivery in a network according to an implementation.

FIG. 2 is a flow chart illustrating a method 300 for retrying message delivery in a network according to an implementation. For clarity of presentation, the description that follows generally describes method 200 in the context of FIGS. 1 and 3. However, it will be understood that method 200 may be performed, for example, by any other suitable system, environment, software, and hardware, or a combination of systems, environments, software, and hardware as appropriate. In some implementations, various steps of method 200 can be run in parallel, in combination, in loops, and/or in any order.

At 202, once a failure occurs in a message communication between the sender and the receiver system, an interval of time—a retry window (RW) for one or more retry attempts to send a message from a sender system to a target system—is determined. In typical implementations, the RW is of a fixed duration (e.g., pre-configured). In some instances the RW can be configurable (e.g., by an administrator using a GUI) for a particular sender, groups of senders, and/or all senders. In some implementations, the RW can be dynamically determined. From FIG. 2, from 202, method 200 proceeds to 204.

At 204, an interval of time—a minimum silent interval (MSI)—is determined. The MSI represents the minimum permitted time interval between two successive retry attempts. In typical implementations, the MSI is of a fixed duration (e.g., pre-configured). In some instances the MSI can be configurable (e.g., by an administrator using a GUI) for a particular sender, groups of senders, and/or all senders. In some implementations, the MSI can be dynamically determined. The MSI can also be dependent on the determined time slot size (see 206 below). From 204, method 200 proceeds to 206.

At 206, the determined RW is divided into N time slots. In some implementations, the N time slots are each of equal duration in which retry attempts will take place. In other implementations, one o more of the N time slots can have different durations from the other N time slots.

Turning now to FIG. 3, FIG. 3 illustrates a timing diagram 300 associated with a sender system retrying message delivery in a network according to an implementation. The RW 302 is illustrated encompassing the entire retry attempt time period. MSI 304 is illustrated between two retry attempts 306a and 306b of particular required sent time duration (typically the same or substantially the same amount of time required to attempt a retry). It is known whether each retry attempt is successful or fails (e.g., TCP, HTTP, etc. response codes and the like). Five (N=5) time slots 308a-308e are also illustrated. For example, the RW could be a total of 10 seconds with five time slots of 2 seconds duration each and the MSI set to 0.25 seconds. Returning to FIG. 2, from 206, method 200 proceeds to 208.

At 208, the sender system randomly determines a point-in-time for a retry attempt inside a time slot (starting at t=0) using a probability distribution. This has the effect of generating random intervals 310a-310d (note that the MSI 304 also represents another random interval that in the example is the length of the MSI). Referring to FIG. 3, the point-in-time for slot 1 308a could be the start of the retry attempt 306a within time slot 1 308a and the point-in-time for slot 2 308b could be the start of the retry attempt 306b. In some implementations, the probability distribution is uniform. In other implementations, the distribution can be any type of probability distribution. In the scenario where the determined point-in-time is greater than the end of the RW, typically the retry attempt is attempted and allowed to finish if possible. In other implementations, the point-in-time can be moved back to fit within the RW as long as the MSI is satisfied (see, e.g., 210 below). In typical implementations, the probability distribution is configured to ensure that the required time of the projected retry attempt will fit entirely within the time slot. In other implementations, the retry attempt can span time slots. From 208, method 200 proceeds to 210.

At 210, a determination is made whether the determined point-in-time is less than the MSI. For example, if the determined point-in-time leads to a time interval between the previous and the current retry attempt that is less than the MSI. Referring to FIG. 3, an example of this scenario would be if determined point-in-time of the retry attempt was somewhere within the MSI 304 as opposed to at or after the start time of the retry attempt 306b (which is at or after the MSI from the end of the retry attempt 306a). If the determined point-in-time is less than the MSI, method 200 proceeds to 212. If the determined point-in-time is not less than the MSI, method 200 proceeds to 214. Note that for a first retry attempt, whether the point-in-time is less than the MSI is not relevant.

At 212, the determined point-in-time is moved to satisfy the MSI. For example, referring to FIG. 3 where the point-in-time of the retry attempt is somewhere within the MSI 304, the point-in-time could be moved forward to a point within time slot 308b and at or after the start time of retry attempt 306b in order to satisfy the MSI. From 212, method 200 proceeds to 214.

At 214, the sender system attempts to resend message at the point-in-time. From 214, method 200 proceeds to 216.

At 216, a determination is made whether the send of the message was successful. For example, the sender system could receive a TCP and/or an HTTP response code indicating either failure or success in the sending of the message. If the message sending was successful, method 200 proceeds to 220 where the algorithm is terminated and method 200 stops. If the message sending was unsuccessful, method 200 proceeds to 218.

At 218, the sender system progresses to the next applicable time slot. Note that the next applicable time slot could be the next slot in the sequence or some slots could be skipped in case they have already elapsed while the last retry attempt was executed (e.g., if the retry attempt took a longer amount of time than illustrated in FIG. 3 or the random interval pushes the next retry attempt into a later time slot). The algorithm then either returns to 208 or, in a case where no more time slots exist for a retry attempt (e.g., RW is finished), terminates with a failure. From 218, method 200 proceeds to 208.

Implementations of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible, non-transitory computer-storage medium for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example, a programmable processor, a computer, or multiple processors or computers. The apparatus can also be or further include special purpose logic circuitry, e.g., a central processing unit (CPU), a FPGA (field programmable gate array), or an ASIC (application-specific integrated circuit). In some implementations, the data processing apparatus and/or special purpose logic circuitry may be hardware-based and/or software-based. The apparatus can optionally include code that creates an execution environment for computer programs, e.g., code that constitutes processor firmware, a protocol stack, a database management system, an operating system, or a combination of one or more of them. The present disclosure contemplates the use of data processing apparatuses with or without conventional operating systems, for example LINUX, UNIX, WINDOWS, MAC OS, ANDROID, IOS or any other suitable conventional operating system.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components as appropriate.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., a CPU, a FPGA, or an ASIC.

Computers suitable for the execution of a computer program can be based on general or special purpose microprocessors, both, or any other kind of CPU. Generally, a CPU will receive instructions and data from a read-only memory (ROM) or a random access memory (RAM) or both. The essential elements of a computer are a CPU for performing or executing instructions and one or more memory devices for storing instructions and data. Generally, a computer will also include, or be operatively coupled to, receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a global positioning system (GPS) receiver, or a portable storage device, e.g., a universal serial bus (USB) flash drive, to name just a few.

Computer-readable media (transitory or non-transitory, as appropriate) suitable for storing computer program instructions and data include all forms of non-volatile memory, media and memory devices, including by way of example semiconductor memory devices, e.g., erasable programmable read-only memory (EPROM), electrically-erasable programmable read-only memory (EEPROM), and flash memory devices; magnetic disks, e.g., internal hard disks or removable disks; magneto-optical disks; and CD-ROM, DVD+/-R, DVD-RAM, and DVD-ROM disks. The memory may store various objects or data, including caches, classes, frameworks, applications, backup data, jobs, web pages, web page templates, database tables, repositories storing business and/or dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD (liquid crystal display), LED (Light Emitting Diode), or plasma monitor, for displaying information to the user and a keyboard and a pointing device, e.g., a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of wireline and/or wireless digital data communication, e.g., a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n and/or 802.20, all or a portion of the Internet, and/or any other communication system or systems at one or more locations. The network may communicate with, for example, Internet Protocol (IP) packets, Frame Relay frames, Asynchronous Transfer Mode (ATM) cells, voice, video, data, and/or other suitable information between network addresses.

The computing system can include clients and servers. A client and server are generally remote from each other and typically interact through a communication network. The relationship of client and server arises by virtue of computer programs running on the respective computers and having a client-server relationship to each other.

In some implementations, any or all of the components of the computing system, both hardware and/or software, may interface with each other and/or the interface using an application programming interface (API) and/or a service layer. The API may include specifications for routines, data structures, and object classes. The API may be either computer language independent or dependent and refer to a complete interface, a single function, or even a set of APIs. The service layer provides software services to the computing system. The functionality of the various components of the computing system may be accessible for all service consumers via this service layer. Software services provide reusable, defined business functionalities through a defined interface. For example, the interface may be software written in JAVA, C++, or other suitable language providing data in extensible markup language (XML) format or other suitable format. The API and/or service layer may be an integral and/or a stand-alone component in relation to other components of the computing system. Moreover, any or all parts of the service layer may be implemented as child or sub-modules of another software module, enterprise application, or hardware module without departing from the scope of this disclosure.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation and/or integration of various system modules and components in the implementations described above should not be understood as requiring such separation and/or integration in all implementations, and it should be understood that the described program components and systems can generally be integrated together in a single software product or packaged into multiple software products.

Particular implementations of the subject matter have been described. Other implementations, alterations, and permutations of the described implementations are within the scope of the following claims as will be apparent to those skilled in the art. For example, the actions recited in the claims can be performed in a different order and still achieve desirable results.

Accordingly, the above description of example implementations does not define or constrain this disclosure. Other changes, substitutions, and alterations are also possible without departing from the spirit and scope of this disclosure.

What is claimed is:

1. A computer-implemented method comprising:
   determining a retry window (RW) for two or more retry attempts to send a message to a target system;
   determining a minimum silent interval (MSI) representing the minimum permitted time interval between two successive retry attempts;
   dividing the RW into two or more time slots of N duration, each time slot separated from a successive time slot by the MSI;
   randomly determining, by a hardware processor, a point-in-time within a time slot starting from the beginning time of the time slot; and
   sending a message as a retry attempt to the target system at the point-in-time.

2. The method of claim 1, wherein the RW can be of a fixed duration or dynamically determined.

3. The method of claim 1, wherein the MSI can be of a fixed duration or dynamically determined.

4. The method of claim 1, where the random determination is performed using a uniform probability distribution.

5. The method of claim 1, comprising determining that the determined point in time within the time slot is less than the determined MSI and moving the point-in-time within the time slot to satisfy the MSI.

6. The method of claim 1, comprising determining whether the sending of the message as a retry attempt was successful.

7. The method of claim 6, comprising progressing to the point-in-time in the next applicable time slot once if it is determined that the sending of the message as a retry attempt was not successful.

8. A non-transitory, computer-readable medium storing computer-readable instructions executable by a computer and configured to:
   determine a retry window (RW) for two or more retry attempts to send a message to a target system;
   determine a minimum silent interval (MSI) representing the minimum permitted time interval between two successive retry attempts;
   divide the RW into two or more time slots of N duration, each time slot separated from a successive time slot by the MSI;
   random determining a point-in-time within a time slot starting from the beginning time of the time slot; and
   send a message as a retry attempt to the target system at the point-in-time.

9. The medium of claim 8, wherein the RW can be of a fixed duration or dynamically determined.

10. The medium of claim 8, wherein the MSI can be of a fixed duration or dynamically determined.

11. The medium of claim 8, where the random determination is performed using a uniform probability distribution.

12. The medium of claim 8, configured to determine that the determined point in time within the time slot is less than the determined MSI and moving the point-in-time within the time slot to satisfy the MSI.

13. The medium of claim 8, configured to determine whether the sending of the message as a retry attempt was successful.

14. The medium of claim 13, configured to progress to the point-in-time in the next applicable time slot once if it is determined that the sending of the message as a retry attempt was not successful.

15. A system, comprising:
   a memory;
   at least one hardware processor interoperably coupled with the memory and configured to:
      determine a retry window (RW) for two or more retry attempts to send a message to a target system;
      determine a minimum silent interval (MSI) representing the minimum permitted time interval between two successive retry attempts;
      divide the RW into two or more time slots of N duration, each time slot separated from a successive time slot by the MSI;
      random determining a point-in-time within a time slot starting from the beginning time of the time slot; and
      send a message as a retry attempt to the target system at the point-in-time.

16. The medium of claim 15, wherein the RW can be of a fixed duration or dynamically determined.

17. The medium of claim 15, wherein the MSI can be of a fixed duration or dynamically determined.

18. The medium of claim 15, where the random determination is performed using a uniform probability distribution.

19. The medium of claim 15, configured to determine that the determined point in time within the time slot is less than the determined MSI and moving the point-in-time within the time slot to satisfy the MSI.

20. The medium of claim 15, configured to:
   determine whether the sending of the message as a retry attempt was successful; and
   progress to the point-in-time in the next applicable time slot once if it is determined that the sending of the message as a retry attempt was not successful.

* * * * *